Patented May 3, 1932

1,856,945

UNITED STATES PATENT OFFICE

JOHN C. CURRIER AND CHARLES W. LIPE, OF SAN JOSE, CALIFORNIA

FRUIT PROCESSING MEANS

Application filed June 25, 1929. Serial No. 373,665.

It is the object of the present invention to provide a simple and efficient means for treating certain foods, such as fruits and nuts, to a prepared liquid bath.

It is another object of the invention to provide a means of the character indicated that may be readily substituted for various means now in use.

It is still a further object of the invention to provide a means of the character indicated that will be economical to manufacture, easily cleaned and kept in good repair, small, compact, and highly efficient in its practical application.

Figure 1:
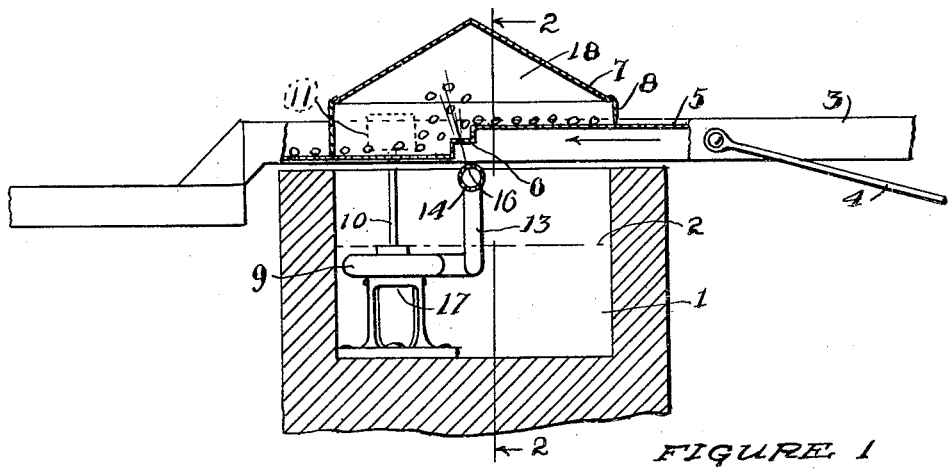
Figure 1 is a sctional view on line 1—1 of Figure 2.
Figure 2:
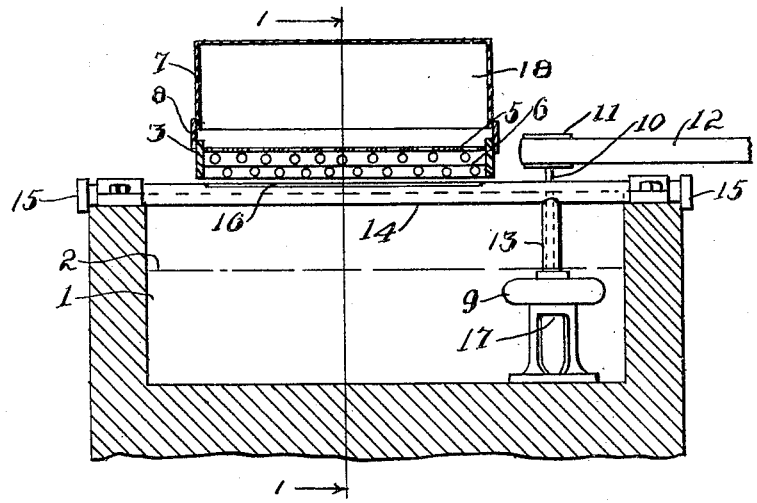
Figure 2 is a sectional view on line 2—2 of Figure 1.
Figure 3:
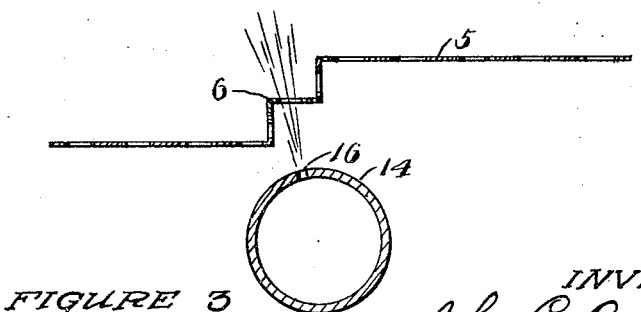
Figure 3 is an enlarged detail illustration of the discharge nozzle and overlying screen.

Referring more particularly to the drawings, we show at 1 a tank such as is commonly used in dipping prunes, and this tank is filled to a suitable level as 2, with the liquid to be used. Passing over the tank is a frame 3 agitated by means not shown through the medium of a pitman 4. The screen 5 mounted in frame 3 may be formed and arranged in any suitable manner to advance the material to be treated thereover in one direction when the frame is agitated, but we have shown a step 6 formed therein and extending transversely thereof immediately over the center of the tank.

At 7 we show a hood mounted over the screen 5 and tank 1 and spaced a little from the screen so that material may pass thereunder. The liquid, and heat when present, is confined within the hood by depending flexible curtains 8, so that liquid entering the chamber under the hood will fall back into the tank 1.

A centrifugal pump 9 is mounted in the tank 1 as shown and is operated by an upwardly extending shaft 10 fitted with a pulley 11 and belt 12, the latter being connected to a driving means not shown. The pump discharges into a vertical pipe 13, upon which is mounted a horizontally disposed pipe 14 fitted with a clean-out at each end as at 15 and having a slot 16 formed in its upper side and extending the full width of the screen 5.

When the machine is in operation the fruit or material being treated is moved over the screen in the direction indicated by the arrow by the shaking of the frame 3, all of the material therefore passing through the chamber formed by hood 7. The liquid picked up by the pump 9 at 17 is discharged in a sheet through slot 16, passing upwardly through the screen 5 into the chamber 18. This stream being continuous and extending the full width of the screen 5 contacts with all of the material passing over the screen, tumbling it about and thoroughly drenching it on every side. The force of the stream may be sufficient to raise the material off of the screen where it will be turned over and over by the turbulence created by the rising stream breaking in the chamber and falling back to the tank.

This device may be readily applied to existing structures known as fruit dippers by merely filling in the shaker screen over the tank, and then placing the hood and pump in position.

This device also has a distinct advantage in that the drawing off of the liquid at one point by the pump, and its return over the entire surface of the tank maintains the solution in a perfectly homogeneous condition.

It is to be understood, of course, that while we have herein shown and described but one specific embodiment of the invention, changes in form, construction, and method of assembly and operation may be made within the scope of the appended claims.

We claim:

1. A fruit spraying apparatus of the character described comprising a liquid tank having an open top to contain a heated spraying solution, a cover spaced from and disposed over the top of said tank, a perforated conveying member movable over said tank and beneath said cover, a pump submerged in the liquid in said tank, said pump having its intake port disposed slightly beneath the level of the liquid in the tank so as to draw off the hottest portion thereof, said pump having a fluid discharge port terminating above the level of the liquid in the tank and disposed beneath the said conveying member for discharging fluid through the latter and on to the fruit to be treated, and means for actuating said pump.

2. An apparatus of the character described including a liquid container to contain a heated spraying solution having an open top, a pump submerged in the liquid in said container and having its inlet port disposed slightly beneath the surface of said liquid so as to draw off the hottest portion thereof, said pump having a discharge port terminating beneath the open top of the container, a spray nozzle carried by said discharge port, a reciprocatory conveyor movable over said tank having parts of its supporting surface spaced from each other and disposed in a substantial horizontal plane, a horizontal perforated step portion disposed intermediate the spaced parts of the conveyor member and connecting the latter, and overlying the spray nozzle so that the spray from the nozzle will be directed upwardly through said step portion, means for reciprocating said conveyor, and means for actuating said pump whereby to force liquid through the perforated step portion to spray objects carried by said conveyor member.

3. An apparatus of the character described including a liquid tank having an open top, a reciprocating conveyor member movable over said top, said conveyor member having a perforated step portion formed intermediate its ends, means for spraying liquid through said perforated step portion, said means including a pump having its intake port disposed slightly beneath and adjacent to the surface of the liquid contained in the tank and having a discharge port formed with spray openings adjacent to and in substantially vertical alignment with said perforated step portion of the conveyor whereby to force liquid through said perforated step portion, and a hood disposed over the conveyor and tank for directing fluid back through the perforated step portion into said tank.

4. In a fruit spraying apparatus, a liquid tank to contain a hot spraying solution having an open top, a cover spaced from and disposed over the top of said tank, a perforated conveying member movable over said tank and beneath said cover, a pump submerged in the liquid in the tank, said pump having its intake port disposed slightly beneath the level of the liquid in the tank so as to draw off the hottest portion thereof and having a discharge port terminating above the level of the liquid in the tank and disposed in operative relation to the conveying member whereby to discharge fluid through the latter and onto the fruit to be treated, and means for actuating the pump.

JOHN C. CURRIER.
CHARLES W. LIPE.